(12) United States Patent
Chon

(10) Patent No.: US 12,659,607 B2
(45) Date of Patent: Jun. 16, 2026

(54) COLOR FILTER ARRAY

(71) Applicant: Nextchip Co., Ltd., Seongnam-si (KR)

(72) Inventor: E Woo Chon, Seoul (KR)

(73) Assignee: Nextchip Co., Ltd., Seongnam-si (KR)

( * ) Notice: Subject to any disclaimer, the term of this patent is extended or adjusted under 35 U.S.C. 154(b) by 37 days.

(21) Appl. No.: 18/714,738

(22) PCT Filed: May 18, 2023

(86) PCT No.: PCT/KR2023/006754
§ 371 (c)(1),
(2) Date: May 30, 2024

(87) PCT Pub. No.: WO2024/025105
PCT Pub. Date: Feb. 1, 2024

(65) Prior Publication Data
US 2025/0047989 A1     Feb. 6, 2025

(30) Foreign Application Priority Data
Jul. 27, 2022     (KR) ........................ 10-2022-0093246

(51) Int. Cl.
*H04N 25/13* (2023.01)
*H04N 23/16* (2023.01)
*H04N 25/133* (2023.01)

(52) U.S. Cl.
CPC ........... *H04N 25/135* (2023.01); *H04N 23/16* (2023.01); *H04N 25/133* (2023.01)

(58) Field of Classification Search
CPC ...... H04N 23/16; H04N 25/135; H04N 25/11; H04N 25/133; H10F 39/8053; H10F 39/12; H10F 39/802
See application file for complete search history.

(56) References Cited

U.S. PATENT DOCUMENTS

| | | | |
|---|---|---|---|
| 11,350,048 B1 * | 5/2022 | Magnani | .................. H04N 9/77 |
| 2011/0310278 A1 | 12/2011 | Bai et al. | |
| 2012/0274762 A1 | 11/2012 | Hu et al. | |
| 2015/0097213 A1 | 4/2015 | Chen et al. | |
| 2016/0118428 A1 | 4/2016 | Tsau | |
| 2021/0409624 A1 * | 12/2021 | Powell | ................. H04N 25/778 |

FOREIGN PATENT DOCUMENTS

| | | |
|---|---|---|
| KR | 2003-0070998 A | 9/2003 |
| KR | 10-0808494 B1 | 2/2008 |
| KR | 2021-0130972 A | 11/2021 |

OTHER PUBLICATIONS

International Search Report (with English Translation) dated Aug. 25, 2023 for International Application No. PCT/KR2023/006754; 4 Pages.

* cited by examiner

*Primary Examiner* — Kelly L Jerabek
(74) *Attorney, Agent, or Firm* — DALY, CROWLEY, MOFFORD & DURKEE, LLP

(57) ABSTRACT
Provided is a color filter array. According to one embodiment, the color filter array may comprise a repeating series of 2*2 cell structures including one red pixel, two green pixels, and one clear pixel, and the one red pixel and the one clear pixel in the 2*2 cell structure may be arranged in a first diagonal direction and the two green pixels may be arranged in a second diagonal direction.

7 Claims, 5 Drawing Sheets

400

| R | G | R | G |
|---|---|---|---|
| G | C | G | C |
| R | G | R | G |
| G | C | G | C |

100

| G | R | G | R |
|---|---|---|---|
| B | G | B | G |
| G | R | G | R |
| B | G | B | G |

| R | C | R | C |
|---|---|---|---|
| C | B | C | B |
| R | C | R | C |
| C | B | C | B |

| Cy | Y | Cy | Y |
|----|---|----|---|
| Y | R | Y | R |
| Cy | Y | Cy | Y |
| Y | R | Y | R |

| R | G | R | G |
|---|---|---|---|
| G | C | G | C |
| R | G | R | G |
| G | C | G | C |

| | RGGB | RCCB | CYYR | RGGC |
|---|---|---|---|---|
| Color reproduction | Good | Poor | Poor | Good |
| Low-illuminance brightness | Poor | Good | Good | Good |
| Red/Yellow distinction | Good | Poor | Good | Good |

FIG. 5

Sensing device 600

Lens
610

Color filter
array
620

Image
sensor
630

640

Signal
processor

Signal processing method 700

Start

710

Receive sensing information created through CFA including a repeating series of 2*2 cell structures including one R pixel, two G pixels, and one C pixel

720

Create color information corresponding to sensing information by considering target application End

COLOR FILTER ARRAY

CROSS REFERENCE TO RELATED APPLICATIONS

This application is a U.S. national stage filing under 35 U.S.C § 371 of PCT Application No. PCT/KR2023/006754 filed on May 18, 2023, and entitled "COLOR FILTER ARRAY," which is based on and claims priority to Korean Patent Application No. 10-2022-0093246, filed on Jul. 27, 2022, which applications are each hereby incorporated herein by reference in their entireties.

TECHNICAL FIELD

The following embodiments relate to a color filter array (CFA).

BACKGROUND ART

A color filter array (CFA) or color filter mosaic (CFM) is arranged in an image sensor that captures color information and passes light according to its wavelength range, and the intensity of the passed light includes color information of light. For example, a Bayer filter may provide information about the intensity of light in each wavelength region in each of the red, green, and blue filters.

DISCLOSURE OF THE INVENTION

Technical Solutions

According to an embodiment, a color filter array (CFA) includes a repeating series of 2*2 cell structures including one red pixel, two green pixels, and one clear pixel, in which, in the 2*2 cell structure, the one red pixel and the one clear pixel are arranged in a first diagonal direction and the two green pixels are arranged in a second diagonal direction.

The red pixel may pass light in a red wavelength band, the green pixels may pass light in a green wavelength band, and the clear pixel may pass the red wavelength band, the green wavelength band, and a blue wavelength band.

Fourth color information corresponding to a blue color for an image application may be created through a combination of first color information according to light passing through the red pixel, second color information according to light passing through the green pixels, and third color information according to light passing through the clear pixel.

Fifth color information corresponding to a yellow color for a recognition application may be created through a combination of first color information according to light passing through the red pixel, second color information according to light passing through the green pixels, and third color information according to light passing through the clear pixel.

According to an embodiment, a sensing device includes a CFA including a repeating series of 2*2 cell structures including one red pixel, two green pixels, and one clear pixel, an image sensor configured to receive light passing through the CFA and configured to create sensing information, and a signal processor configured to create color information corresponding to the sensing information, in which, in the 2*2 cell structure, the one red pixel and the one clear pixel are arranged in a first diagonal direction and the two green pixels are arranged in a second diagonal direction.

According to an embodiment, a signal processing method includes receiving sensing information created through a CFA including a repeating series of 2*2 cell structures including one red pixel, two green pixels, and one clear pixel and creating color information corresponding to the sensing information by considering a target application, in which, in the 2*2 cell structure, the one red pixel and the one clear pixel are arranged in a first diagonal direction and the two green pixels are arranged in a second diagonal direction.

The creating of the color information may include creating fourth color information corresponding to a blue color through a combination of first color information according to light passing through the red pixel, second color information according to light passing through the green pixels, and third color information according to light passing through the clear pixel when the target application is an image application.

The creating of the color information may include creating fifth color information corresponding to a yellow color through a combination of first color information according to light passing through the red pixel, second color information according to light passing through the green pixels, and third color information according to light passing through the clear pixel when the target application is a recognition application.

BRIEF DESCRIPTION OF DRAWINGS

FIGS. 1 to 3 are diagrams illustrating examples of various patterns of a color filter array (CFA).

FIG. 4 is a diagram illustrating an example of a pattern of a CFA, according to an embodiment.

FIG. 5 is a table comparing the characteristics of the patterns of FIGS. 1 to 4.

DETAILED DESCRIPTION OF THE INVENTION

Figure 6:
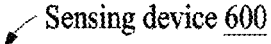
FIG. 6 is a diagram illustrating an example of a structure of a sensing device, according to an embodiment.
Figure 6:
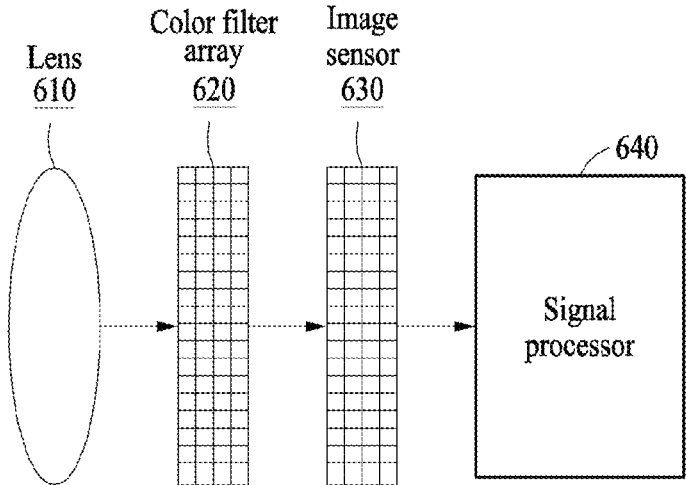

Best Mode for Carrying Out the Invention

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, or similarly, the second component may be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, embodiments will be described in detail with reference to the accompanying drawings. When describing the embodiments with reference to the accompanying drawings, like reference numerals refer to like elements and a repeated description related thereto will be omitted.

A color filter array (CFA) may include color pixels in the form of a two-dimensional (2D) array. The CFA may include a predetermined repeating series of cell structures. The cell structures may have a predetermined size such as 2*2 or 4*4. Each dimension of size may represent the number of color pixels in each dimension direction. For example, the 2*2 cell structure may represent the form in which two color pixels are arranged in one dimension direction and two color pixels are arranged in the other dimension direction. Accordingly, the overall pattern of the CFA may be specified by specifying a cell structure of the CFA. The color pixel may represent each element of the CFA. The color pixel may be distinguished from a sensing pixel of an image sensor and a display pixel of a display panel. The color pixel may be referred to according to the name of a color of a passing wavelength band. For example, a color pixel that passes a green wavelength band may be referred to as a green pixel.

FIGS. 1 to 3 are diagrams illustrating examples of various patterns of a CFA. In FIG. 1, a red-green-green-blue (RGGB) pattern 100 may be referred to as the Bayer pattern and may include a repeating series of 2*2 cell structures including two green (may be referred to as G) pixels, one red (may be referred to as R) pixel, and one blue (may be referred to as B) pixel. The RGGB pattern 100 may represent high color reproduction by reflecting the three primary colors of light, R, G, and B. The color reproduction may refer to the ability to recognize and reproduce colors that humans perceive. R, G, and B accept light in a certain wavelength band, and G may accept a lot of light and have a lot of influence on luminance (brightness), and B and R may have a relatively less influence on luminance. A color with high luminance may be advantageous in securing the amount of lights in a low-illuminance environment.

Various CFAs are being developed to have different characteristics or greater advantages than RGGB. In FIG. 2, a red-clear-clear-blue (RCCB) pattern 200 may use a clear (may be referred to as C) instead of G in the RGGB pattern 100 of FIG. 1, and C may accept light more than G so that more light may be received even in a low-illuminance environment. Through this, an object may be recognized well in a low-illuminance environment or image quality may be improved. Since C is used instead of G, there may be no G of the three primary colors, so red, green, blue (RGB) may be expressed by subtracting R and B from C to create G. The high luminance of C may be advantageous in securing the amount of lights in the low luminance but may not express colors well in a certain environment such as generating rapid saturation in the high luminance (e.g., under bright sunlight).

In FIG. 3, a cyan-yellow-yellow-red (CYYR) pattern 300 may include a repeating series of 2*2 cell structures including one cyan (may be referred to as Cy) pixel, two yellow (may be referred to as Y) pixels, and one R pixel. The R pixel and the Y pixel of the CYYR pattern 300 may facilitate the identification of R and Y, and through this, color information suitable for object recognition (e.g., a sign, a lane, or the like on a road) may be provided. In addition, the Cy pixel, the R pixel, and the Y pixel of the CYYR pattern 300 may accept a lot of light, so it may be easy to secure light in a low-luminance environment. In general, Y may have a characteristic of accepting light more than G. The CYYR pattern 300 may have a limitation in reproducing colors as seen by humans by creating RGB.

FIG. 4 is a diagram illustrating an example of a pattern of a CFA, according to an embodiment. Considering the characteristics of the patterns 100 to 300 of FIGS. 1 to 3 and patterns of other CFAs, color reproduction, ease of object recognition, and ease of securing the amount of lights in the low illuminance may be used as factors to evaluate the performance of patterns of a CFA. The patterns 100 to 300 and the patterns of other CFAs do not satisfy all these evaluation factors.

In FIG. 4, a red-green-green-clear (RGGC) pattern 400 may include a repeating series of 2*2 cell structures including one R pixel, two G pixels, and one C pixel. As shown in FIG. 4, in the 2*2 cell structure, one G pixel and one C pixel may be arranged in one diagonal direction and two G pixels may be arranged in the other diagonal direction. The R pixel may pass light in the red wavelength band, the G pixel may pass light in the green wavelength band, and the C pixel may pass the red wavelength band, the green wavelength band, and the blue wavelength band.

According to the cell structure of the RGGC pattern 400, B may be easily created by subtracting R and G from C, which may be a factor in improving color reproduction. In addition, compared to the GGB pattern 100 in FIG. 1, B may be changed to C, which may be advantageous in securing the amount of lights in the low illuminance. In general, C may accept light more than B. R and Y may also be easily identified by a combination of R and G. For example, Y may be identified by creating B using C, R, and G, and creating Y using G and B. R and Y may be used for object recognition. For example, R/Y information and G information may be used for object recognition.

More specifically, fourth color information corresponding to a B color for an image application may be created through a combination of first color information according to light passing through the R pixel, second color information according to light passing through the G pixel, and third color information according to light passing through the C pixel. For example, the image application may include a camera application for capturing a photo and may provide high color reproduction through R, G, and B colors.

In addition, fifth color information corresponding to a Y color for a recognition application may be created through a combination of first color information according to light passing through the R pixel, second color information according to light passing through the G pixel, and third color information according to light passing through the C pixel. For example, the recognition application may include a recognition application for computer vision (e.g., autonomous driving, user authentication, etc.), and recognition may be performed through R and Y colors.

FIG. 5 is a table comparing the characteristics of the patterns of FIGS. 1 to 4. Referring to FIG. 5, a comparison table 500 may compare the RGGB pattern 100 in FIG. 1, the RCCB pattern 200 in FIG. 2, the CYYR pattern 300 in FIG. 3, and the RGGC pattern 400 in FIG. 4. The RGGB pattern 100 may have good color reproduction and R/Y distinction but poor low-illuminance brightness. The RCCB pattern 200 may have good low-illuminance brightness but poor color reproduction and R/Y distinction. The CYYR pattern 300 may have good low-illuminance brightness and R/Y distinction but poor color reproduction. The RGGC pattern 400 may have good performance in color reproduction, R/Y distinction, and low-illuminance brightness.

FIG. 6 is a diagram illustrating an example of a structure of a sensing device, according to an embodiment. According to an embodiment, a sensing device 600 may include a lens 610, a CFA 620, an image sensor 630, and a signal processor 640. However, the structure of FIG. 6 is only an example, and the sensing device 600 may further include other components (e.g., an infrared filter, etc.) not shown in FIG. 6 or may not include some of the components of FIG. 6.

The lens 610 may condense light. The lens 610 may include at least one sub-lens and may have ultra wide-angle, wide-angle, standard, and/or zoom functions suitable for the purpose.

The CFA 620 may include a repeating series of 2*2 cell structures including one R pixel, two G pixels, and one C pixel. The image sensor 630 may create sensing information by receiving light passing through the CFA 620. Each sensing pixel of the image sensor 630 may sense the intensity of light passing through the wavelength band of each corresponding color pixel. In the 2*2 cell structure, one R pixel and one C pixel may be arranged in one diagonal direction and two green pixels may be arranged in the other diagonal direction.

The signal processor 640 may create color information corresponding to the sensing information. The signal processor 640 may generate an image for recognition and/or a user image using the sensing information. For example, the image for recognition may be generated based on color information including R/Y information and the user image may be generated based on color information including R/G/B information. For example, the image for recognition may be generated based on R/Y information and G information. For example, the signal processor 640 may correspond to an image signal processor (ISP).

The sensing device 600 may be implemented as a part of a mobile device such as a mobile phone, a smartphone, a personal digital assistant (PDA), a netbook, a tablet computer, or a laptop computer, a wearable device such as a smartwatch, a smart band, or smart glasses, a computing device such as a desktop or a server, a home appliance such as a television (TV), a smart TV, or a refrigerator, a security device such as a door lock, or a vehicle such as an autonomous vehicle or a smart vehicle. For example, the sensing device 600 may be used as an imaging sensor such as a camera.

Figure 7:
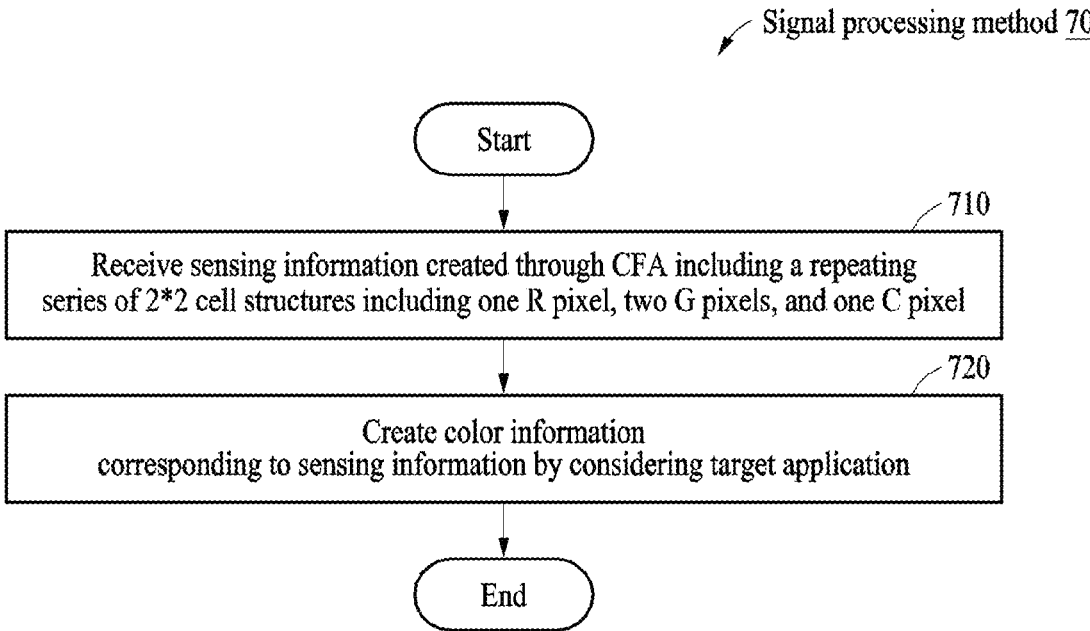
FIG. 7 is a flowchart illustrating a signal processing method based on a CFA, according to an embodiment.

FIG. 7 is a flowchart illustrating a signal processing method based on a CFA, according to an embodiment. Referring to FIG. 7, a signal processing method 700 may include operation 710 of receiving sensing information created through a CFA including a repeating series of 2*2 cell structures including one R pixel, two G pixels, and one C pixel. In the 2*2 cell structure, one R pixel and one C pixel may be arranged in one diagonal direction and two G pixels may be arranged in the other diagonal direction.

The signal processing method 700 may include operation 720 of creating color information corresponding to the sensing information by considering a target application. According to an embodiment, operation 720 may include creating fourth color information corresponding to a B color through a combination of first color information according to light passing through the R pixel, second color information according to light passing through the G pixel, and third color information according to light passing through the C pixel when the target application is an image application. According to an embodiment, operation 720 may include creating fifth color information corresponding to a Y color through a combination of first color information according to light passing through the R pixel, second color information according to light passing through the G pixel, and third color information according to light passing through the C pixel when the target application is a recognition application.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Accordingly, other implementations are within the scope of the following claims.

What is claimed is:

1. A color filter array (CFA) comprising:
a repeating series of 2*2 cell structures comprising one red pixel, two green pixels, and one clear pixel,
wherein, in the 2*2 cell structure, the one red pixel and the one clear pixel are arranged in a first diagonal direction and the two green pixels are arranged in a second diagonal direction,
wherein
the red pixel passes light in a red wavelength band,
the green pixels pass light in a green wavelength band, and
the clear pixel passes the red wavelength band, the green wavelength band, and a blue wavelength band,
wherein fourth color information corresponding to a blue color for an image application is created through a combination of first color information according to light passing through the red pixel, second color information according to light passing through the green pixels, and third color information according to light passing through the clear pixel, and
wherein fifth color information corresponding to a yellow color for a recognition application is created through a combination of first color information according to light passing through the red pixel, second color information according to light passing through the green pixels, and third color information according to light passing through the clear pixel.

2. The CFA of claim 1, wherein the fourth color information is created by subtracting the first color information and the second color information from the third color information, and
wherein the fifth color information is created by using the first color information and the second color information.

3. The CFA of claim 1, wherein the image application comprises a camera application for capturing a photo.

4. The CFA of claim 1, wherein the recognition application comprises a recognition application for computer vision.

5. A sensing device comprising:
a color filter array (CFA) comprising a repeating series of 2*2 cell structures comprising one red pixel, two green pixels, and one clear pixel;

an image sensor configured to receive light passing through the CFA and configured to create sensing information; and
a signal processor configured to create color information corresponding to the sensing information,
wherein, in the 2*2 cell structure, the one red pixel and the one clear pixel are arranged in a first diagonal direction and the two green pixels are arranged in a second diagonal direction,
wherein
the red pixel passes light in a red wavelength band,
the green pixels pass light in a green wavelength band, and
the clear pixel passes the red wavelength band, the green wavelength band, and a blue wavelength band,
wherein fourth color information corresponding to a blue color for an image application is created through a combination of first color information according to light passing through the red pixel, second color information according to light passing through the green pixels, and third color information according to light passing through the clear pixel, and
wherein fifth color information corresponding to a yellow color for a recognition application is created through a combination of first color information according to light passing through the red pixel, second color information according to light passing through the green pixels, and third color information according to light passing through the clear pixel.

6. A signal processing method comprising:
receiving sensing information created through a color filter array (CFA) comprising a repeating series of 2*2 cell structures comprising one red pixel, two green pixels, and one clear pixel; and
creating color information corresponding to the sensing information by considering a target application,
wherein, in the 2*2 cell structure, the one red pixel and the one clear pixel are arranged in a first diagonal direction and the two green pixels are arranged in a second diagonal direction,
wherein the creating of the color information comprises creating fourth color information corresponding to a blue color through a combination of first color information according to light passing through the red pixel, second color information according to light passing through the green pixels, and third color information according to light passing through the clear pixel when the target application is an image application, and
wherein the creating of the color information comprises creating fifth color information corresponding to a yellow color through a combination of first color information according to light passing through the red pixel, second color information according to light passing through the green pixels, and third color information according to light passing through the clear pixel when the target application is a recognition application.

7. A non-transitory computer-readable storage medium storing instructions that, when executed by a processor, cause the processor to perform the method of claim 6.

* * * * *